(12) United States Patent
Brundage et al.

(10) Patent No.: US 7,914,718 B2
(45) Date of Patent: Mar. 29, 2011

(54) GAS PORE FORMER IN CELLULAR MONOLITHS

(75) Inventors: Kevin Robert Brundage, Corning, NY (US); Robert Leonard Bush, Elmira Heights, NY (US); Roger A Rose, Painted Post, NY (US); Yuxin Tang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 330 days.

(21) Appl. No.: 12/199,829

(22) Filed: Aug. 28, 2008

(65) Prior Publication Data

US 2010/0056355 A1    Mar. 4, 2010

(51) Int. Cl.
- B29C 44/34 (2006.01)
- B29C 44/46 (2006.01)
- C08J 9/14 (2006.01)
- C04B 38/00 (2006.01)
- C04B 38/02 (2006.01)
- C04B 38/10 (2006.01)

(52) U.S. Cl. .............. 264/53; 264/51; 264/628; 501/80; 501/84

(58) Field of Classification Search .......... 501/80, 501/84; 264/51, 53, 628
See application file for complete search history.

(56) References Cited

U.S. PATENT DOCUMENTS

| | | | |
|---|---|---|---|
| 3,885,977 A | 5/1975 | Lachman et al. | |
| 4,483,944 A | 11/1984 | Day et al. | |
| 4,855,265 A | 8/1989 | Day et al. | |
| 5,035,921 A | 7/1991 | Berneburg et al. | |
| 5,183,608 A | 2/1993 | Guile | |
| 5,258,150 A | 11/1993 | Merkel et al. | |
| 5,290,739 A | 3/1994 | Hickman | |
| 5,563,106 A * | 10/1996 | Binner et al. | 501/84 |
| 5,874,031 A * | 2/1999 | Okuda et al. | 264/50 |
| 6,210,626 B1 | 4/2001 | Cornelius et al. | |
| 6,319,870 B1 | 11/2001 | Beall et al. | |
| 6,368,992 B1 | 4/2002 | Beall et al. | |
| 6,432,856 B1 | 8/2002 | Beall et al. | |
| 6,537,404 B1 * | 3/2003 | Ishiwatari et al. | 156/78 |
| 6,620,751 B1 | 9/2003 | Ogunwumi | |
| 6,663,776 B2 * | 12/2003 | Hoffman et al. | 210/510.1 |
| 6,773,657 B2 | 8/2004 | Beall et al. | |
| 6,849,181 B2 | 2/2005 | Ogunwumi et al. | |
| 6,864,198 B2 * | 3/2005 | Merkel | 501/80 |
| 6,942,713 B2 | 9/2005 | Ogunwumi et al. | |
| RE38,888 E | 11/2005 | Beall et al. | |
| 7,001,861 B2 | 2/2006 | Beall et al. | |
| 7,141,089 B2 | 11/2006 | Beall et al. | |
| 7,179,316 B2 | 2/2007 | Merkel et al. | |
| 2004/0261384 A1 | 12/2004 | Merkel et al. | |

FOREIGN PATENT DOCUMENTS

| | | |
|---|---|---|
| JP | 2003213304 | 7/2003 |
| WO | 0105542 A1 | 1/2001 |
| WO | 0247893 A1 | 6/2002 |
| WO | 2004/011386 A1 | 2/2004 |
| WO | 2005/046840 A1 | 5/2005 |
| WO | 2006/015240 A2 | 2/2006 |

OTHER PUBLICATIONS

Wang et al. Fabrication of cellular and microcellular ceramics with controllable open-cell content from polysiloxane-LDPE blends: I. Compounding and Foaming. J Mater Sci (2007) 42:2854-2861.*

Young-Wook Kim, Shin-Han Kim, Chunmin Wang and Chul B. Park: Fabrication of Microcellular Ceramics Using Gaseous Carbon Dioxide', Journal of the American Ceramic Society, vol. 86, No. 12, Dec. 2003 (2003-12), pp. 2231-2233, XP002553537.

* cited by examiner

*Primary Examiner* — Jerry Lorengo
*Assistant Examiner* — Noah S Wiese
(74) *Attorney, Agent, or Firm* — Walter M. Douglas

(57) ABSTRACT

Porous ceramic articles may be produced by using a gas as a pore former, where the gas is injected into a ceramic precursor batch material and mixed. Pressure is then applied to mixture such that the gas liquefies. The pressure is maintained during formation of a green body, maintaining the gas in a liquefied state. After formation of the green body, the pressure is removed whereby the gas returns to a gaseous state, creating pores in the green body. The green body may then be fired to produce a porous ceramic article.

15 Claims, No Drawings

GAS PORE FORMER IN CELLULAR MONOLITHS

BACKGROUND

The present invention relates generally to porous ceramic articles and methods for producing the same, and particularly to methods of producing porous ceramic articles using a compressible gas as the pore forming agent.

Porosity in ceramic substrates has been generated for decades by the use of organic pore formers. Typical organic pore formers such as graphite, starch, rice and cork have a large exotherm from 400-900° C. This exotherm results in cracking issues during calcination and very slow ramp rates. Organic pore formers typically produce a ceramic substrate with between 50% and 60% porosity. As the market pushes forward the demand for low cost and high porosity ceramic substrates continues. To achieve high porosity from conventional organic pore formers, a large amount of material must be added. Sometimes greater than 50% organic pore former was needed to achieve 65% porosity. In addition, for high porosity demands, this larger organic pore former loading does not produce equivalent resulting porosity.

Less conventional pore formers such as hydrogen peroxide have also been tried. The hydrogen peroxide is a liquid added in the wet batching process and is carried through the forming and drying steps where its concentration, interactions with other materials and the drying conditions cause its decomposition to form $O_2$ or $NO_2$ gas to form in the wet green body resulting in porosity.

Therefore it would be desirable to have a pore former that provided ceramic substrates having more consistent and greater porosity without the use of a particulate pore former. It would also be desirable if the pore former did not interact with other batch materials affecting rheology, batch flow and extrusion quality or generally cause difficulty in drying such as non-uniform dryness, longer drying schedules and/or cracking or complicate the firing process with exotherms requiring slower ramp rates and longer schedules, that could be controlled to give a desired pore size and would not require a "burn out" period. It would also be advantageous if such a pore former would produce a porous ceramic article having a greater porosity than that achieved with conventional particulate pore former.

SUMMARY

In one aspect of the present invention there is provided a method for producing a porous ceramic article, comprising the steps of providing a precursor batch for forming a porous ceramic article, injecting a gas into the precursor batch and mixing the gas and precursor batch, applying pressure to the precursor batch and gas mixture wherein the pressure is sufficient to liquefy the gas, forming the precursor batch into a green body while maintaining the pressure, removing the pressure from the green body and firing the green body to produce a porous ceramic article.

In another aspect of the present invention there is provided a method for producing a porous ceramic article, comprising the steps of providing inorganic ceramic-forming ingredients, an organic binder and a solvent, mixing the inorganic ceramic forming ingredients, the organic binder and the solvent to form a precursor batch, evacuating air from the precursor batch, injecting carbon dioxide gas into the precursor batch and mixing the gas and precursor batch, applying pressure to the precursor batch and carbon dioxide mixture wherein the pressure is at least about 1650 psi, forming the precursor batch into a green body while maintaining the pressure, removing the pressure from the green body and firing the green body to produce a porous ceramic article.

In a further aspect of the invention there is provided a porous ceramic article formed from a ceramic precursor batch comprising inorganic ceramic-forming ingredients and carbon dioxide, wherein the carbon dioxide is liquefied by the application of a pressure of at least 1650 psi to the ceramic precursor batch.

Additional features and advantages of the invention will be set forth in the detailed description which follows, and in part will be readily apparent to those skilled in the art from that description or recognized by practicing the invention as described herein, including the detailed description which follows and the claims.

It is to be understood that both the foregoing general description and the following detailed description present embodiments of the invention, and are intended to provide an overview or framework for understanding the nature and character of the invention as it is claimed serve to illustrate various embodiments and explain the principles and operations of the invention.

DETAILED DESCRIPTION

Broadly, the present invention provides an improved method for manufacturing porous ceramic articles that, for example, can be useful in ceramic filter applications. The method for producing a porous ceramic article may comprise the steps of providing a ceramic precursor batch for forming a porous ceramic article where the ceramic precursor batch may comprise inorganic ceramic-forming ingredients, an organic binder and a solvent. The method may also comprise injecting a gas into the ceramic precursor batch and mixing the gas and precursor batch together. Pressure may then be applied to the to the ceramic precursor batch and gas mixture. The pressure must be sufficient to liquefy the gas. By way of non-limiting example, carbon dioxide is liquefied at pressures of at least 1650 psi. The ceramic precursor batch and gas mixture may then be formed into a green body while maintaining the pressure. After the green body is formed, pressure is release and the liquefied gas become gaseous, creating pores in the green body. Finally, the green body is dried and fired to produce a porous ceramic article.

Another advantage of using pore forming agents comprising at least one gas that may be liquefied prior to forming the green body is that reduction of the pressure after the green body is formed may yield pore-generating gas at relatively low temperatures that are generally less than 400° C. Thus the use of a gas pore formers can offer several processing advantages over the conventional pore forming agents that typically require a dedicated hold time at relatively high temperatures during the firing cycle in order to burn out the pore former by, for example, combustion. In use, the pore forming gases of the present invention expand when pressure is removed to yield pore-generating gas at relatively low temperatures that are generally less than 400° C. The resulting pore microstructure that is formed by the evolving gases is further retained in the ceramic article after firing at temperatures greater than 1200° C. Further, because the pore forming gases expand once the pressure is released at low temperatures, a desired pore microstructure can be formed while drying a formed green body rather than during a burn out cycle at temperatures greater than 1200° C. Thus, it will be appreciated that the gas pore former can enable the use of a shorter firing schedule during processing which can, for example, provide an increased strength by reducing article cracking that can result from high exotherms during conventional firing schedules.

The use of as gas as a pore former is novel and surprising in that it would be expected that the voids left by the evolution of the gas to collapse during drying or sintering. A hypothesis could be that the gas interferes with particle packing to create voids. After forming the green body by, for example, extrusion, the highly filled and viscous system resists any further flow to fill the voids. Another surprising result is that the gas does not cause "rice krispies" as the monolith exits the die. A hypothesis here could be that the gas extrudes through the die as an uncompressible liquid, and after extrusion the evolution of gas is slow and delayed which allows for diffusion of the gas to the surface verses a sudden burst.

In one embodiment of present invention, the pore former of the present invention may be a gas. The gas may liquefy when pressure is applied to the pore former mixed with a ceramic precursor batch material and then expand after pressure is released to expand back into a gas, forming pores. The pressure exerted on the gas and ceramic precursor batch mixture is the normal pressure found during formation of the green body using methods such as, but not limited to, extrusion. In an illustrative embodiment the gas is carbon dioxide. Carbon dioxide is an inexpensive, stable gas that may liquefy at pressure of at least 1650 psi at temperatures found during normal molding or extrusion processes. Other gases, such as chlorine, may also be used. The skilled artisan would be able to determine what gases may be used without any undue experimentation by looking up the critical temperature and pressure of a gas. The critical temperature is the temperature at which and above a gas will not liquefy no matter how much pressure is added. Thus, a gas that has a critical temperature below 0° C., may not be a useful in the present invention.

After the pore forming gas is injected into and mixed with the ceramic precursor batch, sufficient pressure may be applied to the mixture to liquefy the gas. Once the gas is liquefied, the mixture of the ceramic precursor batch and the gas may be further mixed to produce a homogenous mixture, or as close to a homogenous mixture as possible. Alternatively, the ceramic precursor batch may be placed under vacuum before injecting the gas pore former. Placing the precursor batch under vacuum may remove air from the precursor batch, allowing for a higher capacity for the gas pore former.

In a subsequent the step, the ceramic precursor batch may be formed into a green body while the pressure is maintained and the gas remains liquefied. After forming the green body, the pressure may be removed, allowing the gas to return to a gaseous state and form pores as it expands. The porous green body may then be fired to form a porous ceramic article.

In another embodiment, the method of the present invention may further comprise the step of drying the green body before firing. In one exemplary embodiment, the green body may be dried at a temperature less than 400° C., or from about 100° C. to about 350° C. In an illustrative embodiment, the green body is dried by microwave drying. The drying of the green body may increase the conversion rate of the pore former from a liquid to a gas and forming pores. The rate of expansion of the liquefied gas may be controlled by controlling the release of pressure and the temperature of the drying step.

In a further embodiment, the pore forming agent may be present in any amount effective to provide a desired porosity in the ceramic article. In one exemplary embodiment, the pore forming agent may from about 0.5 wt % to about 2 wt %. As used herein, a "wt. %" or "weight percent" or "percent by weight" of an organic component, unless specifically stated to the contrary, is based on the total weight of the total inorganics in which the component is included. Organics are specified herein as superadditions based upon 100% of the inorganics used. In one illustrative example, it was observed that as little as 0.5% of $CO_2$ increased the porosity of a ceramic article from about 40% to about 45%, whereas 1% of $CO_2$ increased the porosity to about 50%. The actual pore size also increased almost two-fold.

In yet another embodiment, conventional pore formers may also be added to the inorganic ceramic-forming ingredients in addition to the pore forming agents. Conventional pore formers can typically be any particulate substance that "burns out" of the formed green body during the firing step. This may include any fugitive particulate material which evaporates or undergoes vaporization by combustion during drying or heating of the green body to further obtain a desired, usually larger porosity and/or coarser median pore diameter than would otherwise be obtained. Exemplary and non-limiting optional burnout agents that can be used include organics that are solid at room temperature, elemental carbon, graphite, cellulose, sugars, flour, starches, and other pore forming materials known in the art. Conventional pore formers may be present in the precursor batch composition at up to about 80 wt %.

In one embodiment, the inorganic batch components can be any combination of inorganic components which, upon firing, can provide a primary sintered phase composition. The inorganic ceramic-forming ingredients may be cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, e.g., silicon carbide, silicon nitride, soda lime, aluminosilicate, borosilicate, soda barium borosilicate or combinations of these, as well as others. Combinations of these materials may be physical or chemical combinations, for example, mixtures or composites, respectively.

In one exemplary embodiment, the inorganic ceramic-forming ingredients may yield an aluminum-titanate ceramic material upon firing. In another exemplary embodiment, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. Nos. 3,885,977; RE 38,888; 6,368,992; 6,319,870; 6,210,626; 5,183,608; 5,258,150; 6,432,856; 6,773,657; 6,864,198, 7,141,089 and 7,179,316, which are herein incorporated by reference as filed. Some ceramic batch material compositions for forming aluminum titanate that are especially suited to the practice of the present invention are those disclosed in U.S. Pat. Nos. 4,483,944; 4,855,265; 5,290,739; 6,620,751; 6,942,713; 6,849,181; 7,001,861; and in PCT Application Publication Nos. WO 2006/015240; WO 2005/046840; and WO 2004/011386, which are herein incorporated by reference.

The inorganic ceramic-forming ingredients, the organic binder and the pore forming agent may be mixed together with a solvent to form the ceramic precursor batch. The solvent may provide a medium for the binder to dissolve in, thus providing plasticity to the batch and wetting of the powders. The solvent may be aqueous based, which may normally be water or water-miscible solvents, or organically based. Most useful are aqueous based solvents which provide hydration of the binder and powder particles. Typically, the amount of aqueous solvent is from about 20% by weight to about 50% by weight.

The organic binder may be any binder known in the art for producing ceramic articles. In an exemplary embodiment, the binder may be a cellulose ether binder such as, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and mixtures thereof.

The properties of preferred cellulose-based binders such as methylcellulose may be water retention, water solubility, surface activity or wetting ability, thickening of the mixture, providing wet and dry green strength to the green bodies, thermal gelation and hydrophobic association in an aqueous environment. Cellulose ether binders that promote hydrogen bonding interaction with the solvent may be desirable. Non-limiting examples of substituent groups that maximize the hydrogen bonding interaction with polar solvents e.g. water, may be hydroxypropyl and hydroxyethyl groups, and to a smaller extent hydroxybutyl groups.

In another embodiment of the invention, other additives such as surfactants and oil lubricants may be added to the inorganic ceramic-forming ingredients as long as they do not cause decomposition of the pore forming agent while forming the green body. Non-limiting examples of surfactants that may be used in the practice of the present invention are $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.5% by weight to about 2% by weight.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight. In an exemplary embodiment, the oil lubricants may be present from about 3% by weight to about 6% by weight.

In one embodiment of the invention, the precursor batch may be formed into a green body by any known conventional ceramic forming process, such as, e.g., extrusion, injection molding, slip casting, centrifugal casting, pressure casting, dry pressing, and the like where pressure may be maintained such that the gas pore former remains in a liquid form until the green body is formed. In an exemplary embodiment, extrusion may be done using a hydraulic ram extrusion press, or a two stage de-airing single auger extruder, or a twin screw mixer with a die assembly attached to the discharge end. In the latter, the proper screw elements may be chosen according to material and other process conditions in order to build up sufficient pressure to liquefy the gas pore former and force the batch material through the die.

The green bodies of this invention may have any convenient size and shape and the invention is applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities may range from about 235 cells/$cm^2$ (1500 cells/$in^2$) to about 15 cells/$cm^2$ (100 cells/$in^2$). Examples of honeycombs produced by the process of the present invention, although it is to be understood that the invention is not limited to such, may be those having about 94 cells/$cm^2$ (about 600 cells/$in^2$), or about 62 cells/$cm^2$ (about 400 cells/$in^2$) each having wall thicknesses of about 0.1 mm (4 mils). Typical wall thicknesses may be from about 0.07 to about 0.6 mm (about 3 to about 25 mils), although thicknesses of about 0.02-0.048 mm (1-2 mils) may be possible with better equipment. The method may be especially suited for extruding thin wall/high cell density honeycombs. It will be appreciated that although a honeycomb ceramic filter of the present invention normally may have a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like a "doglegged shape," or the like. In addition, the shape of through holes is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc.

The formed green body having a desired size and shape as described above may then be dried to remove excess moisture after the pressure has been removed. Additionally, as described above, the drying step may also aid in the transition of the gas pore former from the liquid state to a gaseous state resulting in the evolution of pore forming gases. The drying step may be carried out by any known method, including for example, microwave, hot air, autoclave, convection, humidity controlled, freeze drying, critical drying, and any other method that can affect the extent and rate of peroxide decomposition within the formed green body. In one exemplary embodiment, the green body may be dried at a temperature less than 400° C., or from about 100° C. to about 350° C.

In still another embodiment, the microstructure of the resulting ceramic article may be controlled and/or optimized to provide a desired microstructure by selecting optimized drying conditions. For example, exemplary drying conditions may include rapid heating with microwave or dielectrically generated heat in the material that may provide homogeneous pore formation as a result of increasing the rate the liquefied gas pore former is converted back to a gas. The amount of power used may range from several hundred to tens of kilowatts and the duration of drying can be dependent on the size of the ceramic article and composition. In one aspect, the temperature can be raised above 50° C. rapidly to increase the rate the liquefied gas pore former is converted back to a gas and creating pores as the gas escapes the ceramic article.

Once dried, the green body may be fired under conditions effective to convert the green body into a ceramic article comprising a primary crystalline phase ceramic composition as described below.

The firing conditions effective to convert the green body into a ceramic article may vary depending on the process conditions such as, for example, the specific composition, size and/or shape of the green body, and nature of the equipment used. To that end, in one embodiment, the optimal firing conditions specified herein may need to be adapted for very large cordierite structures, i.e., slowed down, for example. However, in one exemplary embodiment, for mixtures that are primarily for forming cordierite, the firing conditions may comprise heating the green body to a maximum soak temperature of between about 1350° C. to about 1450° C. In still another exemplary embodiment, the green body may be fired at a soak temperature in the range of from about 1400° C. to about 1450° C. In still yet another embodiment, the green body may be fired at a soak temperature in the range of from about 1415° C. to about 1435° C., including a preferred soak temperature of, for example, of between about 1420° C. and about 1430° C.

The firing times may also range from approximately 40 to 250 hours, during which a maximum soak temperature can be reached and held for a soak time in the range of from about 5 hours to about 50 hours, more preferably between about 10 hours to about 40 hours. In still another aspect, the soak time may be in the range of from about 15 hours to about 30 hours. A preferred firing schedule includes firing at a soak temperature of between about 1415° C. and 1435° C. for between about 10 hours to about 35 hours.

It should be appreciated that the gas pore formers of the present invention and the methods of using the gas pore formers may be used to manufacture ceramic articles having any desired microstructure and further exhibiting any desired performance property or combination of performance properties. For example, a ceramic article may be produced possessing a microstructure characterized by a unique combination of relatively high porosity (but not too high) that can provide improved flow through properties within the material and still exhibit a high strength and chemical durability. The resulting ceramic structure may therefore be useful for ceramic filter applications requiring high thermal durability and high filtration efficiency coupled with low pressure drop across the filter. Such ceramic articles are particularly well suited for filtration applications, such as diesel exhaust filters.

In another embodiment, the method of the present invention may further provide ceramic articles having any desired porosity. For example, the total porosity (% P) of the inventive ceramic bodies, as measured by mercury porosimetry, may in one aspect be greater than 40%. In another embodiment, the total porosity of the ceramic article may be greater than 50%.

In still a further embodiment, the inventive method may be used to provide porous ceramic articles having any desired pore size distribution. To that end, the porosity microstructure parameter, $d_{50}$, may relate to the pore size distribution and is used herein, among other parameters, to characterize a pore size distribution. The quantity $d_{50}$ is the median pore diameter based upon pore volume, and is measured in µm; thus, $d_{50}$ is the pore diameter at which 50% of the open porosity of the ceramic honeycomb article has been intruded by mercury.

In one aspect, the median pore diameter, $d_{50}$, of the pores present in the instant ceramic articles can, in one aspect, be at least 5 µm. In another aspect, the median pore diameter, $d_{50}$, is at least 6 µm. In another aspect, the median pore diameter, $d_{50}$, can be in the range of from 5 µm to 7 µm. These ranges provide suitable filtration efficiencies.

In still a further embodiment, the use of a gas pore former in the manufacture of refractory ceramic articles may result in a relatively high permeability in combination with the relatively high strengths. As will be appreciated, a relatively high flow through or permeability coupled with high strength and chemical durability may provide several commercial advantages, such as reduced pressure drop across the ceramic body, increased filtration efficiency, added flexibility in article geometry, an increased product durability.

EXAMPLES

The invention will be further clarified by the following example.

An aluminum containing ceramic paste was prepared having 19.1 wt % alumina, 40.5 wt % talc, 34.7 wt % clay and 5.7 wt % silica as the inorganic ingredients. The ceramic paste also had 2.7 wt % Methocel, 0.6 wt % stearic acid and 6.0 wt % non-solvent materials (i.e. Durasyn 162). The wt % of these ingredients is based on the total inorganic composition. Water was added to the dry ingredients in the range of 24-26 wt %. The $CO_2$ injection experiment was run using an 32 mm twin screw extruder (for example, extruders from Coperion Corporation, Ramsey, N.J. or Werner & Pfleiderer, Stuttgart, Germany) that has 9 stages or barrels through which the batched composition is moved by the screws and mixed before reaching the extrusion dies. The screw was modified with an extra shear disc in barrel 6. This allowed the air to be evacuated in the vacuum zone placed before barrel 6 which is followed by the new shear disc which created a seal to prevent the $CO_2$ from traveling backward and out through a vent port stuffer with the air. A mass flow controller was used to inject $CO_2$ into the downstream pressure port in barrel 6. This point is downstream of the new shear disc seal and well before the "backup zone" high pressure exit of the twin screws which feed the batched composition into the extrusion dies. The $CO_2$ was metered in to pressurize barrel 6, and was mixed into the batch in barrels 6-9. Pressures in these barrels can reach ~500 psi due to the gas pressure. The $CO_2$ gas was mixed into the batch and carried into the high pressure "backup length" zone. The amount of $CO_2$ used was 1% and 2% $CO_2$ levels by weight. In this experiment $P_{max}$ was in the range of about 2000-2500 psi. Under pressures greater than 1065 psi the $CO_2$ will compress into a liquid and act as a lubricant or solvent reducing the pressures and torque on the extruder. The $CO_2$ was further mixed into the batch in the high pressure backup zone and as the batch travels through a region located before die area where it encounters elongational shear and mixing. As the batch flows through the die, pressure decreases to below 1065 psi and the $CO_2$ returns to the gaseous state accompanied by an increase in volume. The extruded parts were microwave dried and fired using a standard firing cycle used for commercial products which has been described in patents and applications of Corning Incorporated. Typical fired properties were measured and are reported in Tables 1a and 1b.

TABLE 1a*

| Sample | $CO_2$ wt % | Porosity % | Porosity Intrusion ml/g | $d_{50}$ µm | Water Abs. % | CTE 800 C. in/in/c × $10^7$ | Mini- MOR Strength psi |
|---|---|---|---|---|---|---|---|
| 1 | 0 | 38.8 | 0.2525 | 3.3 | 30.0 | 4.7 | 468 |
| 2 | 1 | 49.8 | 0.3918 | 5.9 | 47.7 | 4.8 | 378 |
| 3 | 0 | 39.3 | 0.2570 | 3.2 | 29.5 | 5.2 | 494 |
| 3.5 | 0 | 39.9 | 0.2642 | 3.2 | 30.3 | 5.5 | 471 |
| 4 | 1 | 46.2 | 0.3469 | 6.5 | 43.2 | 5.0 | 330 |
| 5 | 0.5 | 45.1 | 0.3246 | 5.5 | 39.1 | 4.6 | 365 |
| 6 | 0 | 35.7 | 0.2218 | 2.9 | 26.6 | 5.7 | 519 |
| 6A | 0 | 35.2 | 0.2205 | 3.0 | 27.1 | 5.4 | 511 |
| 7 | 1 | 45.1 | 0.3286 | 4.9 | 41.7 | 4.6 | 273 |
| 10 | 0 | 39.5 | 0.2571 | 3.2 | 32.9 | 5.4 | 443 |

TABLE 1a*-continued

| Sample | $CO_2$ wt % | Porosity % | Intrusion ml/g | $d_{50}$ μm | Water Abs. % | CTE 800 C. in/in/c $\times 10^7$ | Mini-MOR Strength psi |
|---|---|---|---|---|---|---|---|
| 11 | 1 | 52.1 | 0.4238 | 6.6 | 51.1 | 5.4 | 235 |
| 12 | 2 | 50.6 | 0.4053 | 5.8 | 51.8 | 5.6 | 246 |

*Feed/Speed at 45 lb/hr/30 rpm

TABLE 1b

| Sample | $CO_2$ wt % | Porosity % | Intrusion ml/g | $d_{50}$ μm | Water Abs. % | CTE 800 C. in/in/c $\times 10^7$ | Mini-MOR Strength psi |
|---|---|---|---|---|---|---|---|
| A | 0 | 38.8 | 0.2473 | 2.9 | 29.4 | 5.4 | 489 |
| B | 1 | 43.1 | 0.2934 | 4.0 | 32.4 | 5.3 | 347 |
| C | 0 | 38.2 | 0.2424 | 3.1 | 28.1 | 5.4 | 455 |
| D | 2 | 47.1 | 0.3466 | 5.3 | 44.3 | 5.3 | 296 |
| E | 0 | 38.9 | 0.2519 | 2.9 | 30.7 | 6.0 | 459 |
| F | 1 | 48.5 | 0.3739 | 6.7 | 43.2 | 4.7 | 291 |

$CO_2$ was evaluated as an extrusion aid and lubricant/solvent to improve pressure, torque and extrusion quality. It was observed through fired physical properties that the $CO_2$ was dispersed within the green formed structure providing increased pore volume and pore size. In general one percent $CO_2$ increased porosity from about 39% to about 50% and pore size from about 3.2 μm to about 6.0-6.5 μm. The increase was apparent for all water and durasyn levels. An interesting and surprising observation was that the CTE did not show any increase with the addition of $CO_2$ as a pore former. $CO_2$ may potentially be used as a pore former for ceramic articles requiring very high porosity levels, with the advantage over traditional pore formers in that there are no drying or burnout issues and no increase in CTE.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A method for producing a porous ceramic article, comprising the steps of:
   providing a precursor batch for forming a porous ceramic article;
   injecting a gas into the precursor batch and mixing the gas and precursor batch;
   applying pressure to the precursor batch and gas mixture wherein the pressure is sufficient to liquefy the gas;
   forming the precursor batch into a green body while maintaining the pressure;
   removing the pressure from the green body; and
   firing the green body to produce a porous ceramic article;
   wherein the amount of gas is from about 0.5 wt % to about 2.0 wt %, wherein the wt % is based on 100% of the inorganic ceramic-forming materials.
2. The method of claim 1 further comprising the step of placing the precursor batch under vacuum before injecting the gas.
3. The method of claim 1 further comprising the step of mixing the precursor batch and the liquefied gas.
4. The method of claim 1 wherein the gas is carbon dioxide.
5. The method of claim 1 wherein the pressure is at least about 1650 psi.
6. The method of claim 1 further comprising the step of drying the green body before firing.
7. The method of claim 6 wherein the green body is dried by microwave drying.
8. The method of claim 1 wherein the green body is formed by extrusion.
9. The method of claim 1 wherein the inorganic ceramic-forming ingredients comprise cordierite or aluminum-titanate forming ingredients.
10. The method of claim 1 wherein the firing comprises heating the green body for a period of time sufficient to convert the green body into the ceramic article, wherein the ceramic article comprises a primary sintered phase composition.
11. A method for producing a porous ceramic article, comprising the steps of:
    providing inorganic ceramic-forming ingredients, an organic binder and a solvent;
    mixing the inorganic ceramic forming ingredients, the organic binder and the solvent to form a precursor batch;
    evacuating air from the precursor batch;
    injecting carbon dioxide gas into the precursor batch and mixing the gas and precursor batch;
    applying pressure to the precursor batch and carbon dioxide mixture wherein the pressure is at least about 1650 psi;
    forming the precursor batch into a green body while maintaining the pressure;
    removing the pressure from the green body; and
    firing the green body to produce a porous ceramic article.
12. The method of claim 11 wherein the amount of gas is from about 1.0 wt % to about 2.0 wt %, wherein the wt % is based on 100% of the inorganic ceramic-forming materials.
13. The method of claim 11 wherein the green body is formed by extrusion and wherein the pressure is from about 2000 psi to about 2500 psi.
14. The method of claim 11 wherein the inorganic ceramic-forming ingredients comprise cordierite or aluminum-titanate forming ingredients.
15. The method of claim 11 further comprising the step of drying the green body before firing.

* * * * *